(12) United States Patent
Falke

(10) Patent No.: US 9,033,180 B1
(45) Date of Patent: May 19, 2015

(54) FROZEN CONFECTION DRIP CATCHER

(71) Applicant: Gina L. Falke, Levittown, NY (US)

(72) Inventor: Gina L. Falke, Levittown, NY (US)

(*) Notice: Subject to any disclaimer, the term of this patent is extended or adjusted under 35 U.S.C. 154(b) by 0 days.

(21) Appl. No.: 14/268,755

(22) Filed: May 2, 2014

(51) Int. Cl.
B65D 1/34 (2006.01)
B65D 85/78 (2006.01)
A23G 9/50 (2006.01)

(52) U.S. Cl.
CPC . B65D 1/34 (2013.01); B65D 85/78 (2013.01); A23G 9/503 (2013.01)

(58) Field of Classification Search
CPC ......... B65D 3/28; B65D 83/011; B65D 85/78
USPC .............. 220/571, 571.1, 694, 710, 719, 731, 220/780, DIG. 5, DIG. 6; 248/310, 248/311.2–311.3; 426/115, 134, 138–139
See application file for complete search history.

(56) References Cited

U.S. PATENT DOCUMENTS

| 1,990,198 | A | * | 2/1935 | Murphy | 249/83 |
| 2,321,519 | A | | 6/1943 | Rubinoff | |
| 2,459,073 | A | * | 1/1949 | Hamilton | 229/400 |
| 2,632,708 | A | | 3/1953 | Sueskind | |
| 4,350,712 | A | | 9/1982 | Kocharian et al. | |
| 5,515,998 | A | * | 5/1996 | Wang | 220/710 |
| 6,032,825 | A | * | 3/2000 | Guthrie | 220/731 |
| 6,182,854 | B1 | * | 2/2001 | Jimenez et al. | 220/705 |
| 6,502,715 | B2 | * | 1/2003 | Miorelli | 220/719 |
| 6,571,979 | B2 | * | 6/2003 | Schmarr | 220/571 |
| 8,153,177 | B2 | * | 4/2012 | Sotile | 426/115 |
| 8,747,928 | B2 | * | 6/2014 | Price et al. | 426/134 |
| 2006/0254301 | A1 | * | 11/2006 | Beltezore et al. | 62/343 |
| 2007/0148296 | A1 | * | 6/2007 | Price et al. | 426/420 |
| 2009/0068324 | A1 | * | 3/2009 | Sandoval | 426/134 |
| 2011/0223292 | A1 | * | 9/2011 | Kushner et al. | 426/134 |

* cited by examiner

Primary Examiner — Bryon Gehman
Assistant Examiner — Brijesh V. Patel
(74) Attorney, Agent, or Firm — Crossley Patent Law

(57) ABSTRACT

A frozen confection drip catcher including a drip-catching cup-shaped shield having a spout for drinking the melted contents contained within a reservoir of the shield and a support body centrally disposed on the shield, the support body having a slot in an apex thereof to support a stick for holding the frozen confection in an upright position. The shield has a flat bottom wall to self-support the frozen confection. A peg on the bottom wall within the reservoir engages an aperture in the bottom end of the support body thereby stabilizing the support body within the reservoir and enabling the support body to be removed for cleaning.

7 Claims, 5 Drawing Sheets

FROZEN CONFECTION DRIP CATCHER

BACKGROUND OF THE INVENTION

Various types of drip catchers for frozen confections, such as melting popsicles and ice cream cones, are known in the prior art. One known drip catcher has a cup on each of an opposite end to catch drips from a melting a popsicle at one end and an ice cream cone at the other end. Another similar device provides a drip catching plate with a central aperture in which a frozen confection is held. Still another holder has an upper portion with a shelf on which a frozen confection is supported and a lower portion with drain openings into a base that catches drips and, further, a drinking straw that extends into the base. A frozen beverage stick that includes a retractable cup to shield a frozen food item from heat, but also allow licking of the frozen food items. None of the foregoing drip catchers provide a cup-shaped shield that includes a spout for drinking the melted frozen confection and provides a structure which will not only capture the drips, but will also self-support the frozen confection in an upright position. However, the present is a frozen confection drip catcher including a drip-catching cup-shaped shield having a spout for drinking the melted contents and a support body centrally disposed in the shield which has a slot in an apex thereof to support a stick for holding the frozen confection.

FIELD OF THE INVENTION

The present invention relates to drip catchers for frozen confections, and more particularly, to a frozen confection drip catcher including a drip-catching cup-shaped shield having a spout for drinking the melted contents stored in the reservoir of the shield and a support body centrally disposed in the shield which has a slot in an apex thereof to support a stick for holding the frozen confection. A peg on the bottom wall within the reservoir engages an aperture in the bottom end of the support body so that the support body is also removable for cleaning.

SUMMARY OF THE INVENTION

The general purpose of the present frozen confection drip catcher, described subsequently in greater detail, is to provide a frozen confection drip catcher which has many novel features that result in a frozen confection drip catcher which is not anticipated, rendered obvious, suggested, or even implied by prior art, either alone or in combination thereof.

To accomplish this, the present frozen confection drip catcher includes devised to support a frozen confection, such as an ice pop or popsicle, in an upright position, while catching and containing drips from the melted the frozen confection to reduce spillage and also providing a structure to allow the drinking of the melted frozen confection contained therein. The device includes a cup-shaped shield having a flat closed bottom wall to permit the device to stand in an upright position and further having an open top end, a continuous outer wall disposed between the bottom wall and the top end, and a reservoir disposed between the outer wall, the bottom wall, and the top end. A peg is centrally vertically disposed on the bottom wall. A spout is disposed in the outer wall proximal the top end of the shield to permit drinking of the melted frozen confection without spillage.

A substantially frustoconical support body, which is centrally disposed within the shield, has a hemispherical apex, a flat bottom end, and a continuous smooth external wall to facilitate the flow of the melted frozen confection into the reservoir. The support body has a length greater than a depth of the shield to permit the licking and eating of the frozen confection without removal from the shield. An aperture, centrally disposed in the bottom end, removably receives the peg therein to secure the bottom end flush against the bottom wall within the shield. The support body is, therefore, removable for cleaning. The bottom end also has a diameter so that the bottom end rests flush against an internal wall of the reservoir. A slot, which is disposed along a longitudinal midline axis of the support body, has an open upper end disposed in the apex and a closed lower end. The hemispherical shape of the apex provides structural support to the slot while holding a stick, upon which a frozen confection is disposed, in an upright position.

Thus has been broadly outlined the more important features of the present frozen confection drip catcher so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
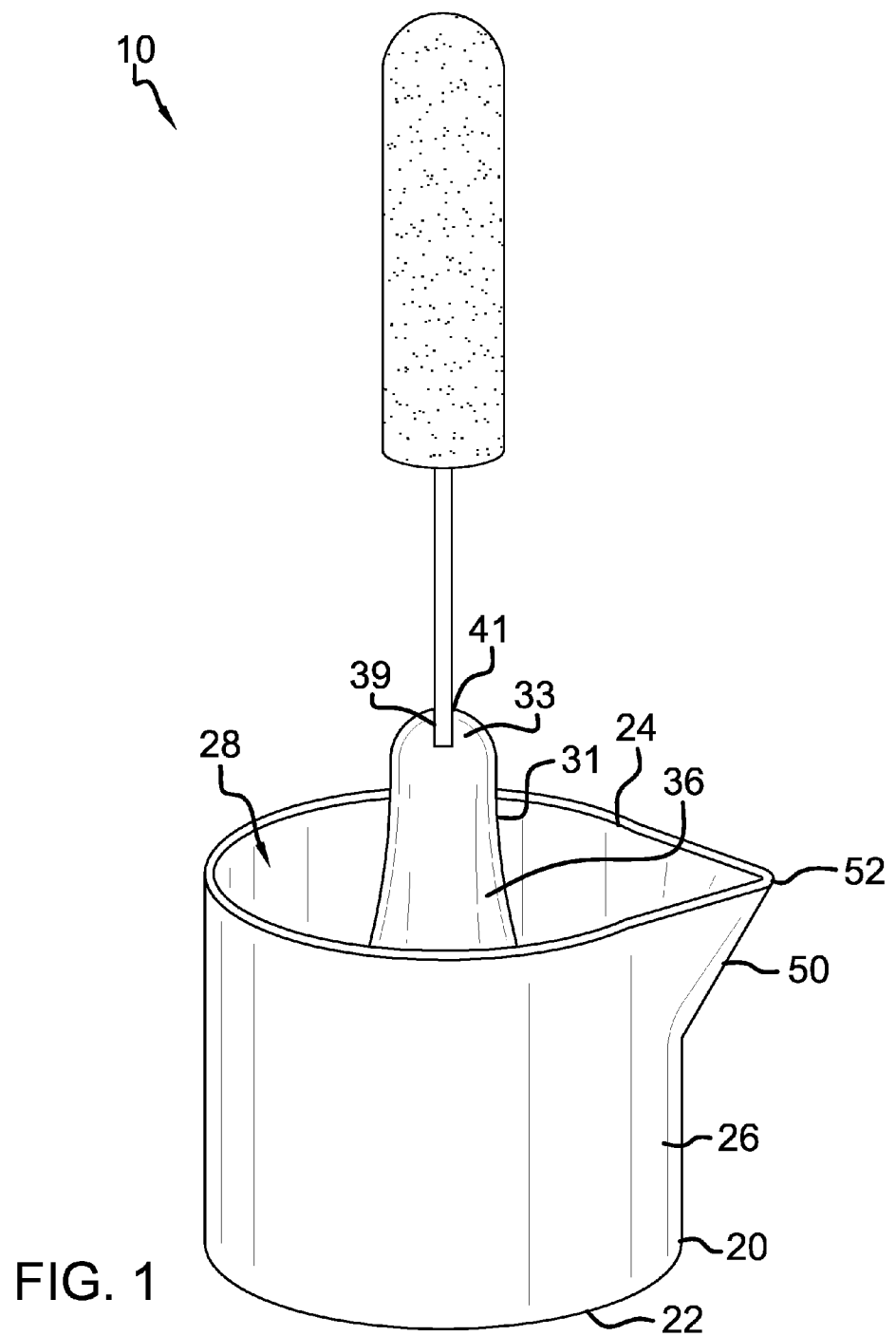
FIG. 1 is an in-use isometric view.
Figure 2:
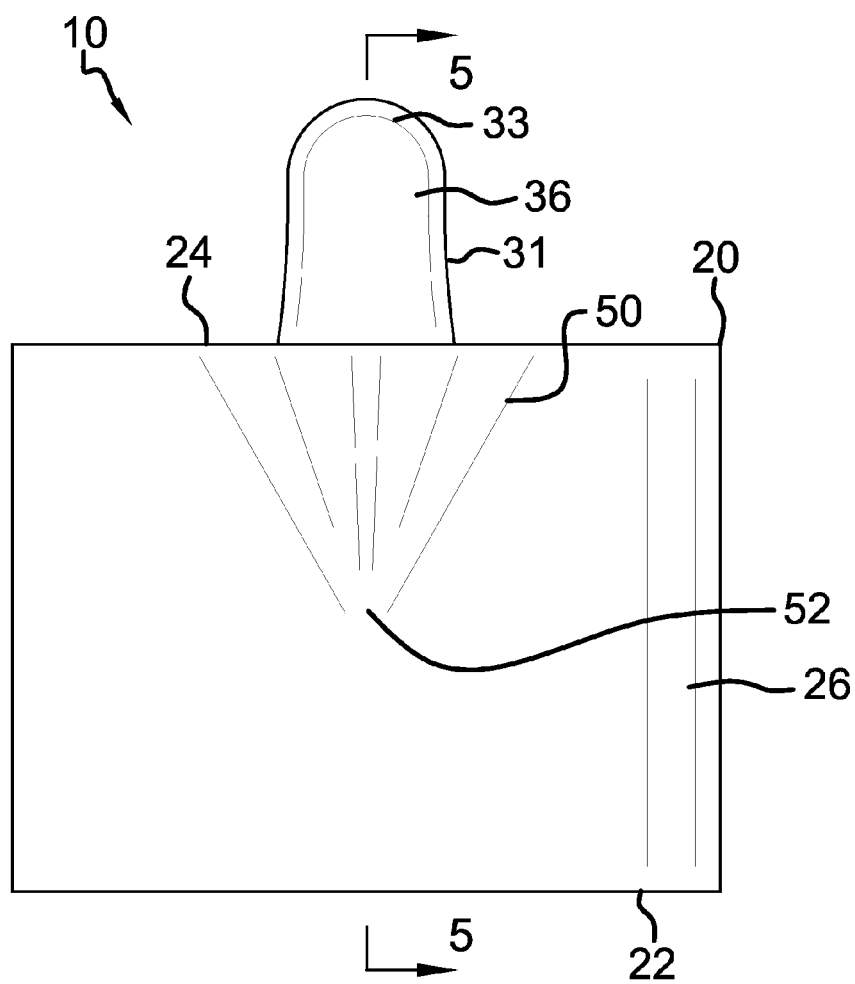
FIG. 2 is a front elevation view.
Figure 3:
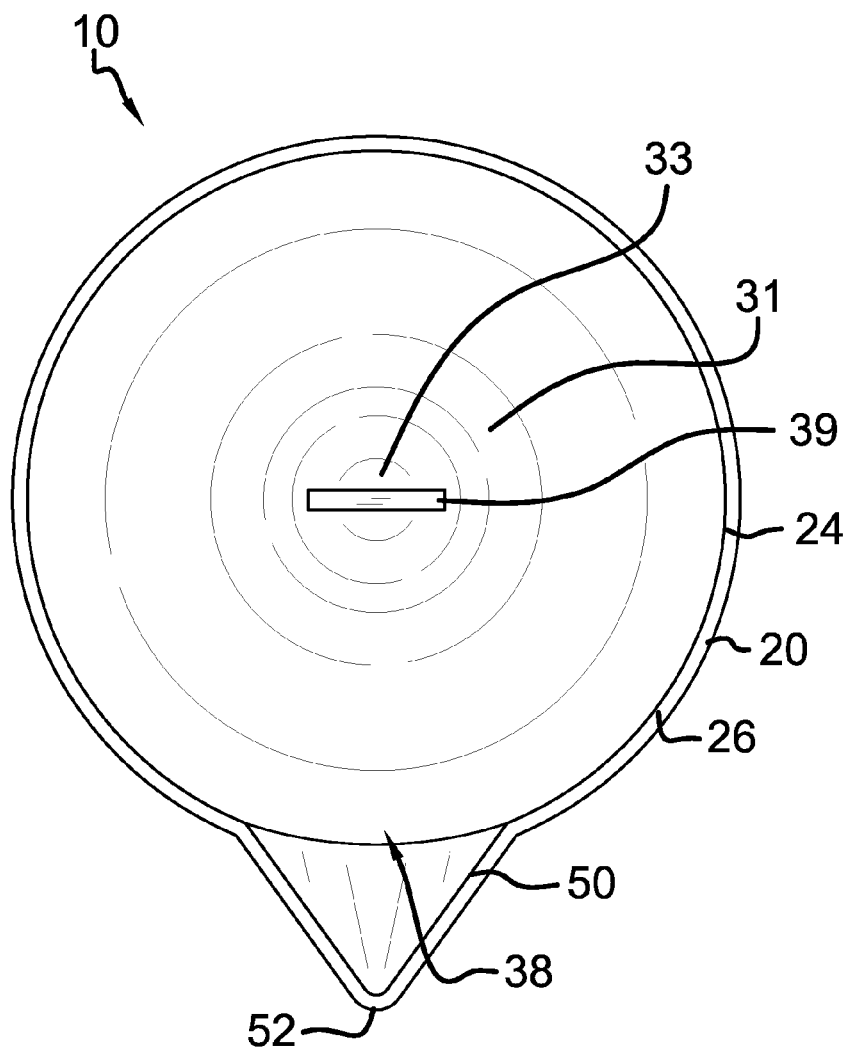
FIG. 3 is a top plan view.
Figure 4:
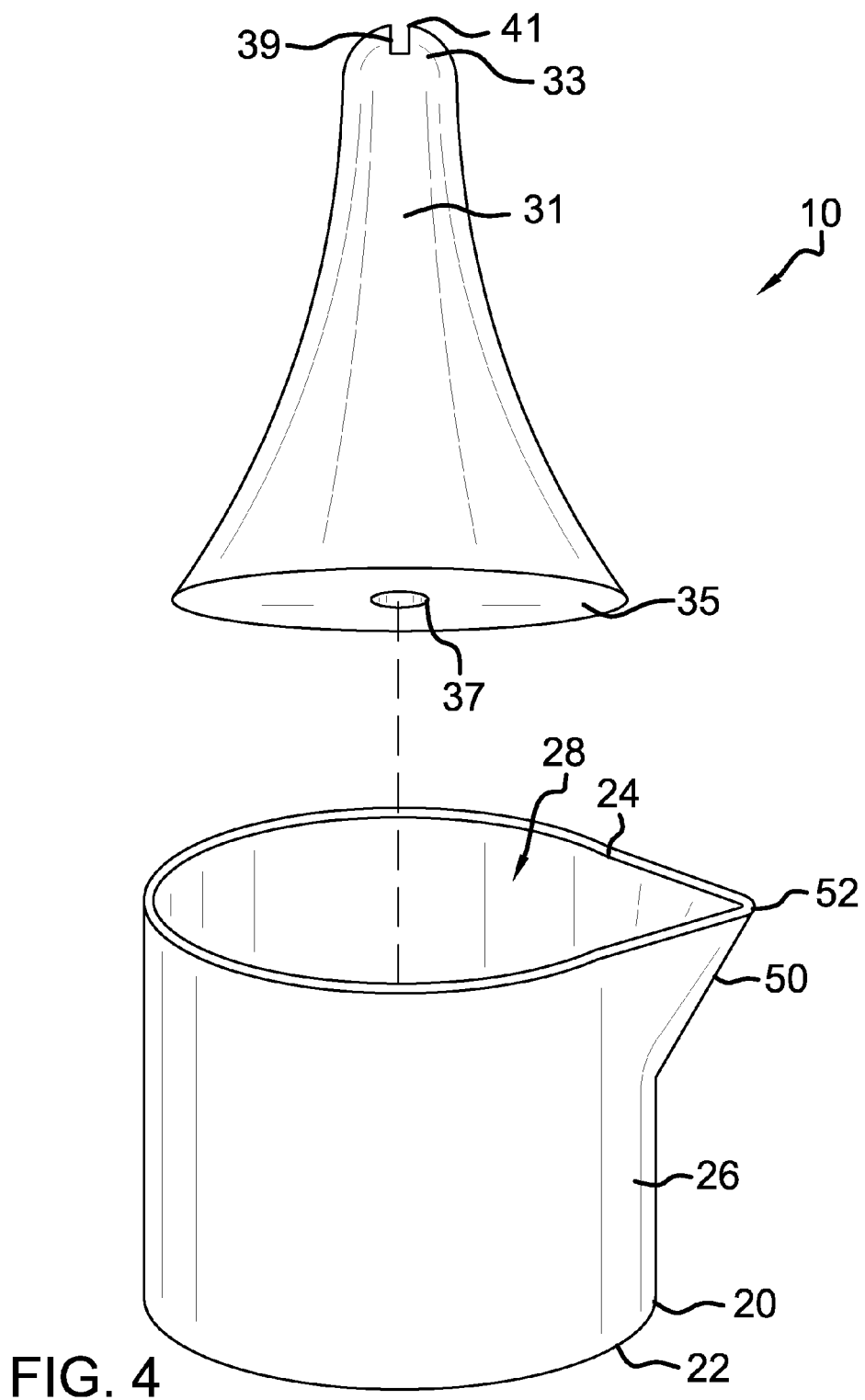
FIG. 4 is an exploded isometric view.
Figure 5:
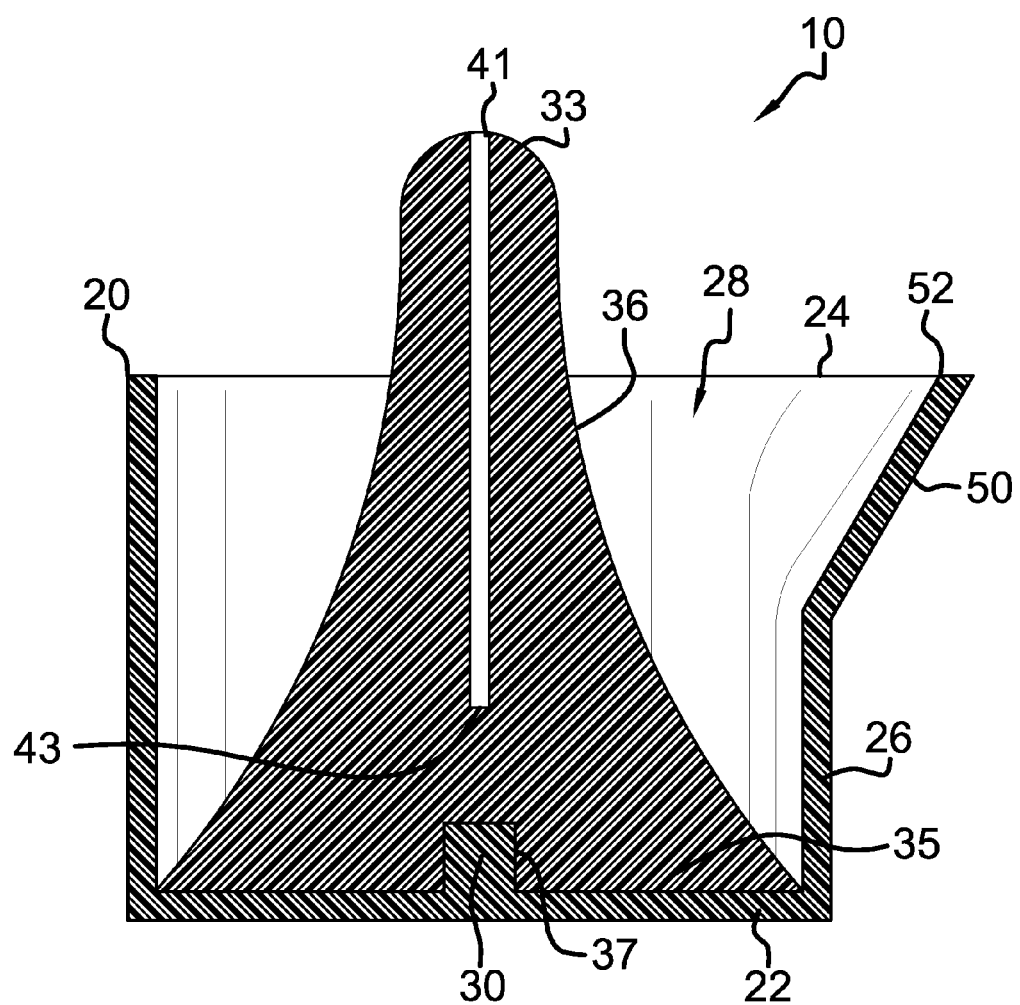
FIG. 5 is a cross-sectional view taken along line 5-5 of FIG. 2.

With reference now to the drawings, and in particular FIGS. 1 through 5 thereof, an example of the instant frozen confection drip catcher employing the principles and concepts of the present frozen confection drip catcher and generally designated by the reference number 10 will be described.

The present frozen confection drip catcher 10 devised to support a frozen confection, such as an ice pop or popsicle, in an upright position, while catching and containing drips from the melted the frozen confection to reduce spillage and also providing a structure to allow the drinking of the melted frozen confection contained therein is illustrated in FIGS. 1 through 5. The frozen confection drip catcher 10 includes a cup-shaped shield 20. The shield 20 has a flat closed bottom wall 22, an open top end 24, a continuous outer wall 26 disposed between the bottom wall 22 and the top end 24, and a reservoir 28 disposed between the outer wall 26, the bottom wall 22, and the top end 24. A peg 30 is centrally vertically disposed on the bottom wall 22. The bottom wall 22 of the shield 20 is flat to permit the device 10 to stand in an upright position when the device 10 is not being held. The reservoir 28 is provided to contain drips from the melting frozen confection.

A substantially frustoconical support body 31 is centrally disposed within the shield 20. The support body 31 having a hemispherical apex 33, a flat bottom end 35, and a continuous smooth external wall 36 disposed between the apex 33 and the bottom end 35. The support body 31 has a length greater than a depth of the shield 20 to permit the licking and eating of the frozen confection without removal from the shield 20. An aperture 37 centrally disposed in the bottom end 35. The peg 30 removably engages the aperture 37 to permit the support body to be removed for cleaning. Upon the engagement of the peg 30 into the aperture 37, the bottom end 35 is securingly disposed on the bottom wall 22 of the shield 20 to stabilize the support body 31 within the reservoir 28. The bottom end 35 of the support body 31 is flat so that the bottom end 35 rests flush against the bottom wall 22 within the reservoir 28. The support body 31 bottom end 35 also has a diameter so that the bottom end 35 rests flush against an internal wall 38 of the reservoir 28. The external wall 36 is smooth to facilitate the flow of the melted frozen confection into the reservoir 28.

A slot 39 is disposed along a longitudinal midline axis of the support body 31. The hemispherical shape, rather than a pointed shape, of the apex 33 accommodates and supports the slot 39. The slot 39 has an open upper end 41 disposed in the apex 33 of the support body 31 and a closed lower end 43 disposed more proximal the bottom end 35 than the apex 33. The slot 39 is configured to removably receive and firmly hold a stick, upon which a frozen confection is disposed, in an upright position.

A spout 50 is disposed in the outer wall 26 proximal the top end 24 of the shield 20. The spout 50 has a V-shaped outer tip 52. The spout 50 allows the drinking of the melted frozen confection contained within the reservoir 28 without spillage.

What is claimed is:

1. A frozen confection drip catcher comprising:
    a cup-shaped shield comprising:
        a closed bottom wall;
        an open top end;
        a continuous outer wall disposed between the bottom wall and the top end;
        a reservoir disposed between the outer wall, the bottom wall, and the top end;
    a substantially frustoconical support body centrally disposed within the reservoir, the support body having an apex, a bottom end, and a continuous smooth external wall disposed between the apex and the bottom end, the bottom end securingly disposed on the bottom wall of the shield; and
    a slot disposed along a longitudinal midline axis of the support body, the slot having an open upper end disposed in the apex of the support body and a closed lower end disposed more proximal the bottom end than the apex;
    wherein the slot is configured to removably receive and firmly hold a stick upon which a frozen confection is disposed in an upright position.

2. The frozen confection drip catcher of claim 1 wherein the support body has a length greater than a depth of the shield.

3. The frozen confection drip catcher of claim 2 further comprising a spout disposed in the outer wall proximal the top end of the shield.

4. The frozen confection drip catcher of claim 3 wherein the spout has a V-shaped outer tip.

5. A frozen confection drip catcher comprising:
    a cup-shaped shield comprising:
        a flat closed bottom wall;
        an open top end;
        a continuous outer wall disposed between the bottom wall and the top end;
        a reservoir disposed between the outer wall, the bottom wall, and the top end;
        a peg centrally vertically disposed on the bottom wall;
    a substantially frustoconical support body centrally disposed within the reservoir, the support body having an apex, a bottom end, and a continuous smooth external wall disposed between the apex and the bottom end;
    an aperture centrally disposed in the bottom end, wherein the peg removably engages the aperture; and
    a slot disposed along a longitudinal midline axis of the support body, the slot having an open upper end disposed in the apex of the support body and a closed lower end disposed more proximal the bottom end than the apex; and
    wherein upon the engagement of the peg into the aperture, the bottom end is securingly disposed on the bottom wall of the shield;
    wherein the slot is configured to removably receive and firmly hold a stick upon which a frozen confection is disposed in an upright position; and
    wherein the support body has a length greater than a depth of the shield.

6. A frozen confection drip catcher comprising:
    a cup-shaped shield comprising:
        a flat closed bottom wall;
        an open top end;
        a continuous outer wall disposed between the bottom wall and the top end;
        a reservoir disposed between the outer wall, the bottom wall, and the top end;
        a peg centrally vertically disposed on the bottom wall;
    a substantially frustoconical support body centrally disposed within the reservoir, the support body having a hemispherical apex, a bottom end, and a continuous smooth external wall disposed between the apex and the bottom end;
    an aperture centrally disposed in the bottom end, wherein the peg removably engages the aperture;
    a slot disposed along a longitudinal midline axis of the support body, the slot having an open upper end disposed in the apex of the support body and a closed lower end disposed more proximal the bottom end than the apex; and
    a spout disposed in the outer wall proximal the top end of the shield;
    wherein upon the engagement of the peg into the aperture, the bottom end is securingly disposed on the bottom wall of the shield;
    wherein the slot is configured to removably receive and firmly hold a stick upon which a frozen confection is disposed in an upright position; and
    wherein the support body has a length greater than a depth of the shield.

7. The frozen confection drip catcher of claim 6 wherein the spout has a V-shaped outer tip.

* * * * *